3,029,583
CUTTER BAR AND REEL
Sylvester Patt, Willoughby, Ohio
Filed Sept. 8, 1959, Ser. No. 838,571
2 Claims. (Cl. 56—26)

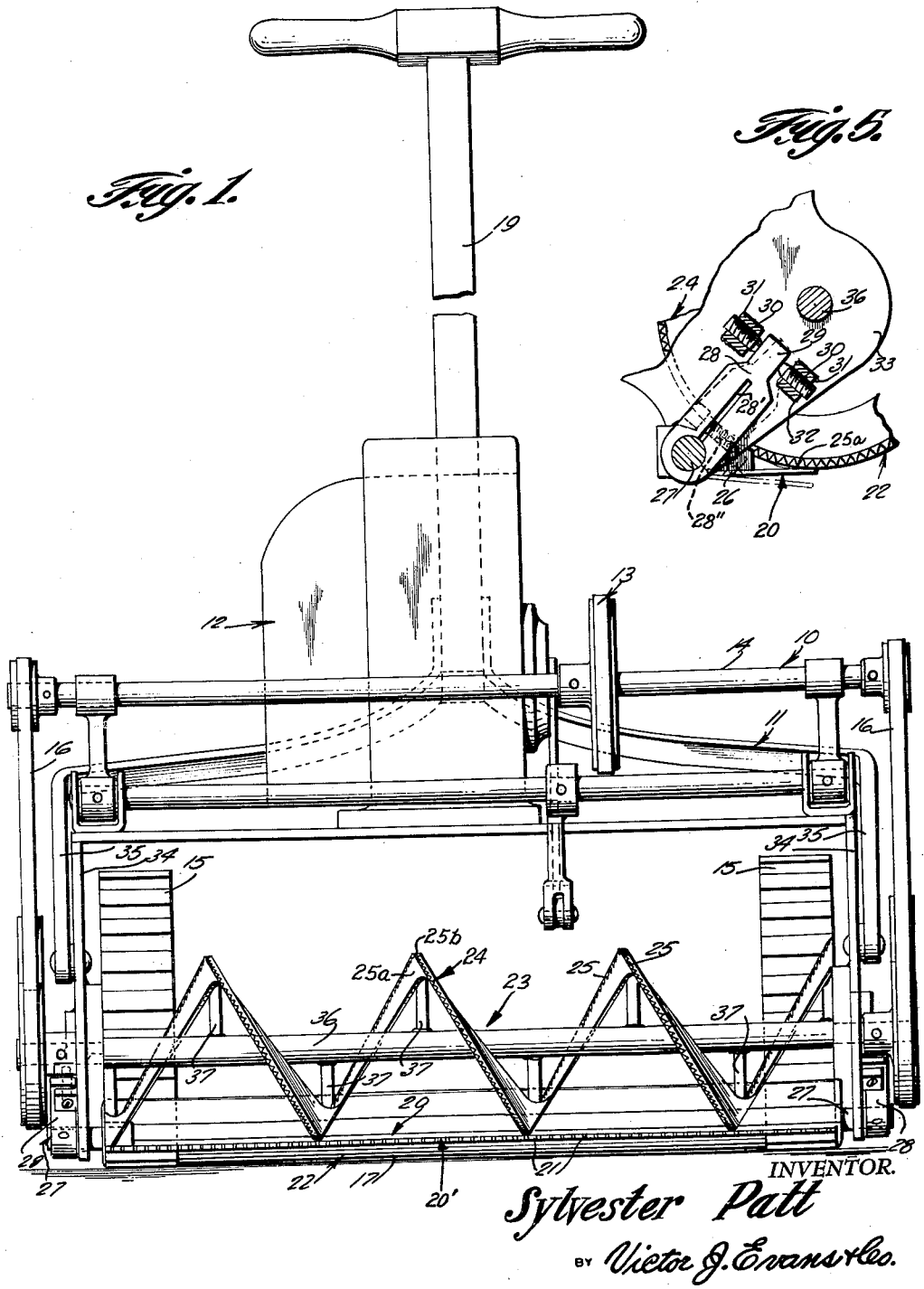

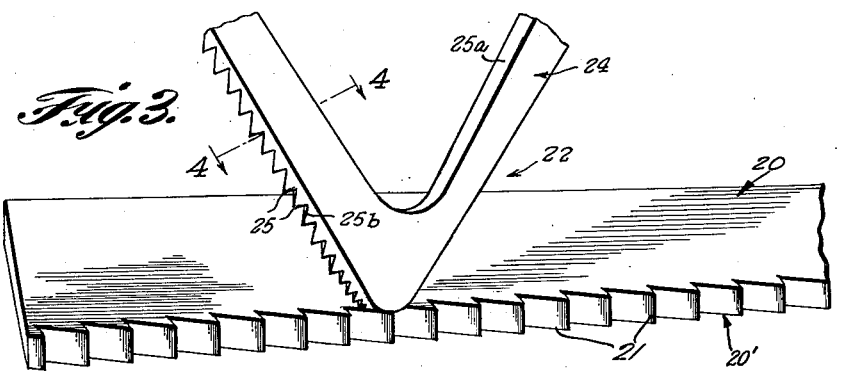
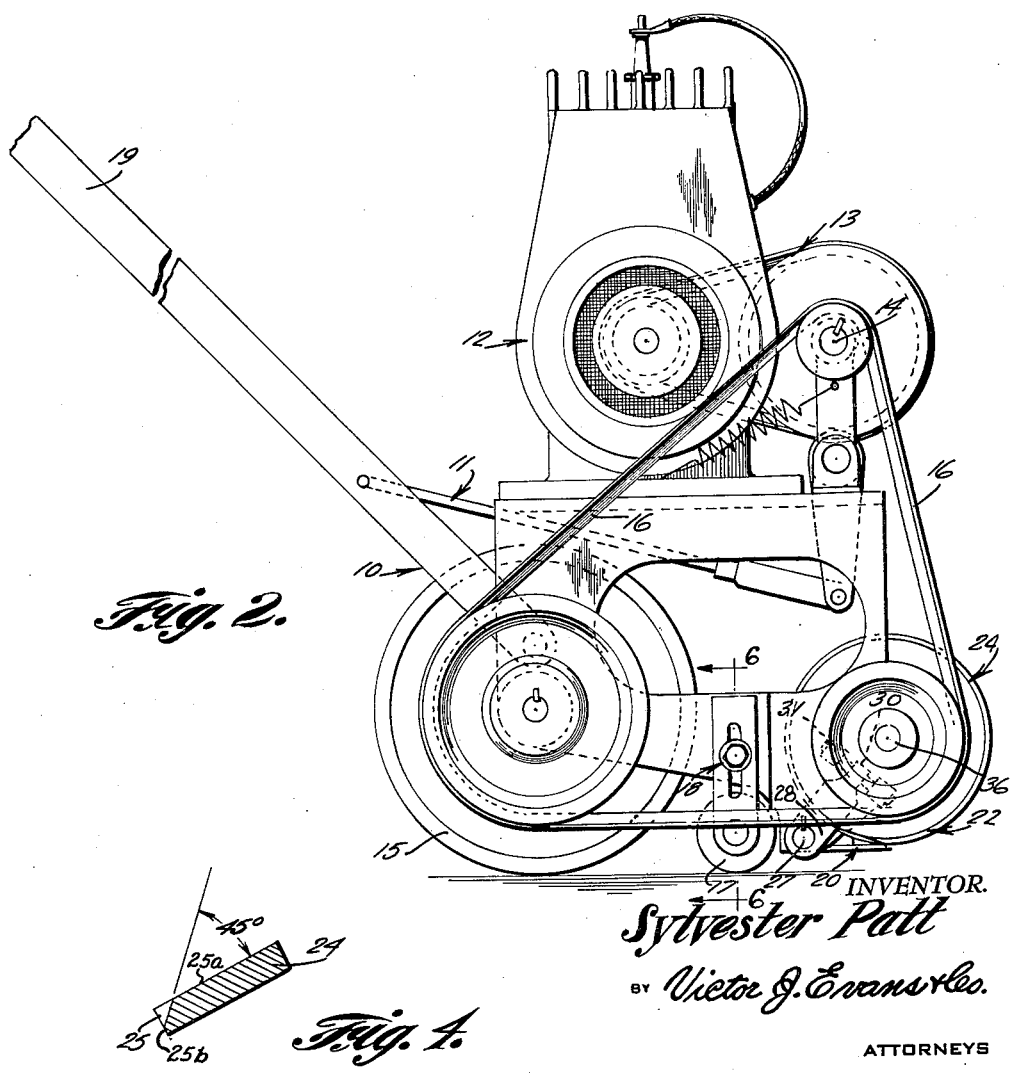

This invention relates to a lawnmower, and more particularly to a cutter bar and reel for a lawnmower.

The object of the invention is to provide a lawnmower which includes an improved cutter bar and reel so that grass, weeds, or the like can be more effectively and easily trimmed or cut.

Another object of the invention is to provide a lawnmower which includes an adjustable cutter bar that is provided with teeth on its leading edge, and wherein there is further provided a reel for coaction with the cutter bar, the reel consisting of a spiral blade which also has teeth thereon for conjoint action with the teeth of the cutter bar in gathering and cutting grass and weeds as hereinafter more fully explained.

A further object of the invention is to provide a cutter bar and spiral blade reel which is extremely simple and inexpensive to manufacture.

The principal feature of the invention by which grass and weeds are more effectively cut than with prior reel-type mowers involves a toothed, spiral blade having a short lead and making a plurality of turns about its axis of rotation, whereby upstanding, tall grass and weeds may move between successive turns of the spiral blade and into engagement with the cutter bar without being knocked down by the rotating spiral blade and flattened by the cutter bar without being cut. By providing teeth along the advancing edge of the rotating spiral blade of this type, grass and weeds engaged by the blade before being engaged by the cutter bar tend to be caught by the blade teeth and drawn into engagement with the cutter bar, instead of being knocked away from the cutter bar. When the still upstanding grass and weeds engage the cutter bar, the teeth on the cutter bar hold them against being knocked over sideways by the rotating blade, thus further insuring that they will be cut between the blade and the cutter bar even if the teeth on the blade should not alone hold all of the grass and weeds against being flattened. Although the teeth on a spiral blade of this character are alone remarkably effective in preventing flattening of grass and weeds and insuring that they will be cut, the additional, conjoint action of the teeth on the cutter bar insures effective cutting, even when working in very tall and thick stands of grass and weeds.

Other objects and advantages will be apparent during the course of the following description.

In the accompanying drawings, forming a part of this application, and wherein like numerals are used to designate like parts throughout the same:

FIGURE 1 is a front elevational view of a lawnmower constructed according to the present invention.

FIGURE 2 is a side elevational view.

FIGURE 3 is an enlarged fragmentary perspective view showing a portion of the cutter bar and reel.

FIGURE 4 is an enlarged sectional view taken on the line 4—4 of FIGURE 3.

FIGURE 5 is an enlarged fragmentary sectional view illustrating the adjusting mechanism for adjusting the position of the cutter bar.

Referring in detail to the drawings, the numeral 10 indicates a lawnmower which includes a frame 11 that serves to support a motor or engine 12 of conventional construction, and the motor 12 serves to drive a shaft 14 through the medium of a belt and pulley mechanism 13, FIGURES 1 and 2. The numeral 15 indicates ground engaging wheels which are driven from the shaft 14 through the medium of belt and pulley mechanism 16 or the like. The numeral 17 indicates the usual roller which is adapted to be adjusted through the medium of a conventional roller mounting mechanism 18 (not shown in detail). There is also provided a handle 19 for use in steering or guiding the lawnmower.

According to the present invention there is provided a cutting mechanism which is indicated generally by the numeral 22, and the cutting mechanism 22 for the lawnmower includes a cutter bar 20 which is provided with a plurality of spaced apart teeth 21, and these teeth 21 are arranged in the leading or forward edge 20', FIGURE 3. The cutting mechanism 22 also includes a reel 23 which consists of a spiral blade 24, and the blade 24, having a short lead and making several turns about its axis, is provided with teeth 25, FIGURES 3 and 4. The teeth 25 on the blade 24 are cut into the side 25a and edge surface 25b of the blade (FIGS. 1 and 4), the edge surface 25b of the blade being the portion that wipes the cutter bar 20 with a cutting action in a conventional manner (FIG. 5). As will be apparent from the drawing, the cutting mechanism 22 is disposed sufficiently forwardly of any transverse members of the frame 11 which might engage tall grass and weeds so that the grass and weeds will not be pushed over and flattened by any portion of the frame before being cut between the blade 24 and cutter bar 20.

A means is provided for adjusting the position of the cutter bar 20, and this means is shown in detail in FIGURE 5.

In FIGURE 5 there is illustrated a portion of an adjusting mechanism for adjusting the positions of the cutter bar 20. Thus, it will be seen that in FIGURE 5 blocks 26 are secured to the cutter bar 20 in any suitable manner, as for example by welding. The numeral 27 indicates a rod which is suitably affixed to the blocks 26, and a split arm 28 is clamped on the rod 27. The arm 28 is provided with an end portion 29, and adjusting set screws or screw members 30 are arranged in threaded engagement with bushings or lugs 31, and the lugs 31 are welded to side members 33. It will be seen that by rotating the set screws 30, the position of the arm 28 can be shifted so as to move the cutter bar 20 whereby the cutter bar 20 can be positioned at the desired location. In actual practice, both of the screws 30 are adapted to be rotated when adjusting the cutter bar so as to properly position the arm 28. The screws 30 are provided with sockets whereby a suitable tool can be arranged in engagement with the screws in order to rotate the screws to the desired position. The members 31 are adapted to be welded in position. The rod 27 may be fitted in the member 26 by means of a press fit. The arm 28 is split and is clamped on the rod 27. The screw members 30 are arranged in threaded engagement with collars or lugs 31 which are suitably affixed to the side members 33, and the side members 33 are adapted to be fastened to frame pieces 34 which may be suitably affixed to the portions 35 of the lawnmower frame, FIGURE 1. As shown in FIGURE 5 for example, the arm 28 is provided with a split or cut-out portion 28', and a securing element 28'' is connected to portions of the arm 28 which are separated by the cut-out portion 28'. Thus, by tightening the securing element 28'', the rod 27 will be securely clamped in the arm 28, so that as the arm 28 moves, the rod 27 will be moved or rotated therewith. Rocking or pivotal movement of the arms 28 is readily accomplished by turning the pair of screw members 30 in opposite directions with respect to each other so that for example one screw member 30 will serve to push the portion 29 in the desired direction by properly rotating such a screw member, and simultaneously the other screw member 30 will be backed away from the portion 29 in order to provide sufficient clearance whereby the arm 28 can move or pivot to the desired location.

The numeral 36 indicates a shaft extended coaxially through the spiral blade 24. The spiral blade 24 is affixed to the shaft 36 by means of spaced apart ribs or braces 37.

From the foregoing, it is apparent that there has been provided an improved cutter bar and reel for an implement such as a lawnmower.

According to the present invention the lawnmower 10 carries the motor 12 which serves to drive the shaft 14 through the belt drive 13 and this power from the shaft 14 is imparted to the wheels 15 and also to the shaft 36 by means of the belt drive 16. Thus, as the lawnmower travels along the ground due to rotation of the wheels 15, the spiral blade 24 will be rotated since the blade 24 is secured to the rotating shaft 36 by means of the braces or ribs 37. The blade 24 carries the teeth 25 which are arranged as shown in FIGURE 4, and the teeth coact with the teeth 21 of the cutter bar 20 so as to effectively and efficiently sever or cut the grass, weeds, or the like which are to be cut by the lawnmower. The spiral blade 24, having a short lead and making several turns about its axis of rotation, with grass-engaging teeth on its leading edge, draws the grass toward the cutter bar with a minimum tendency to knock the grass over in either a forward or sideward direction, thus providing the most advantageous or effective means of cutting the grass.

There is further provided a means for adjusting the position of the cutter bar 20, so that different effects can be accomplished or brought about as desired. To adjust the cutter bar 20, the screw members 30 are rotated by means of a tool such as a screw-driver or the like which is arranged in engagement with the screw members, and this rotation of the screw members 30 will cause movement of the arm 28. Since the arms 28 are affixed to the rod 27, and since the blocks 26 are affixed to the rod 27 and also affixed to the cutter bar 20 it will be seen that this movement of the arms 28 will result in movement of the cutter bar 20 that the cutter bar can be moved or positioned at the desired location.

The parts can be made of any suitable material and in different shapes or sizes.

It is noted that in the present invention there is provided a spiral reel with teeth on an angle and this arrangement serves to draw the grass against the cutter bar which also has coacting teeth. With the grass gathered against the cutter bar it cannot get away whether the grass is short or tall and it also works efficiently for weeds. The spiral reel will not flatten down the grass and instead the grass must get between portions of the reel and at the same time the shape of the reel gradually forces the grass against the cutter bar.

The cutting operation takes place between the reel and the cutter bar without the teeth of the reel and cutter bar meshing, and these teeth merely are adapted to coact so that the grass, weeds or the like therebetween will be cut as the reel rotates.

Minor changes in shape, size, and rearrangement of details coming within the field of invention claimed may be resorted to in actual practice, if desired.

What is claimed is:

1. In a lawnmower of the reel and cutter bar type, a stationary cutter bar and a rotatable, gathering and cutting reel embodying a spiral blade having a short lead and making a plurality of turns about the axis of the reel to permit grass to move into the reel between successive turns of the blade, said blade having a leading edge in cutting engagement with the cutter bar and having a multiplicity of teeth distributed in closely spaced relationship along said leading edge of the blade as it rotates and for substantially the full length of the blade for hooking grass and the like and drawing it toward the cutter bar with a reduced tendency to bend it and push it away from the cutter bar.

2. In a lawnmower as defined in claim 1, a multiplicity of teeth distributed in closely spaced relationship along a leading edge of the cutter bar for substantially the full length thereof to restrain grass from being pushed sideways along the length of the cutter bar by the spiral blade.

References Cited in the file of this patent
UNITED STATES PATENTS

| | | |
|---|---|---|
| 1,957,756 | Campbell | May 8, 1934 |
| 2,625,782 | Allred | Jan. 20, 1953 |
| 2,640,309 | Benson | June 2, 1953 |
| 2,743,570 | Clements | May 1, 1956 |
| 2,767,543 | Ream | Oct. 23, 1956 |
| 2,831,308 | Raba | Apr. 22, 1958 |